M. C. SCHWAB.
SPIRAL BLADE FOR GRAVITY CONVEYERS.
APPLICATION FILED APR. 23, 1908.

1,014,262.

Patented Jan. 9, 1912.

2 SHEETS—SHEET 2.

Witnesses
H. Crocheron
Ernest S. Gale Jr.

By Attorney

Inventor
Martin C. Schwab
C. M. Nissen 1,014,262.

UNITED STATES PATENT OFFICE.

MARTIN C. SCHWAB, OF CHICAGO, ILLINOIS, ASSIGNOR TO GRAVITY CONVEYOR COMPANY, A CORPORATION OF NEW YORK.

SPIRAL BLADE FOR GRAVITY-CONVEYERS.

1,014,262.         Specification of Letters Patent.    Patented Jan. 9, 1912.

Application filed April 23, 1908. Serial No. 428,795.

*To all whom it may concern:*

Be it known that I, MARTIN C. SCHWAB, a citizen of the United States, residing at Chicago, in the county of Cook and State of Illinois, have invented a new and useful Improvement in Spiral Blades for Gravity-Conveyers, of which the following is a specification.

My invention relates to improvements in gravity conveyers, and especially those of the spiral type.

One object of the invention is the provision of simple and practical means for constructing the spiral conveying surface and fastening the same to the conveyer proper.

Other objects will appear hereinafter, the novel combinations of elements being pointed out in the appended claims.

Figure 1:
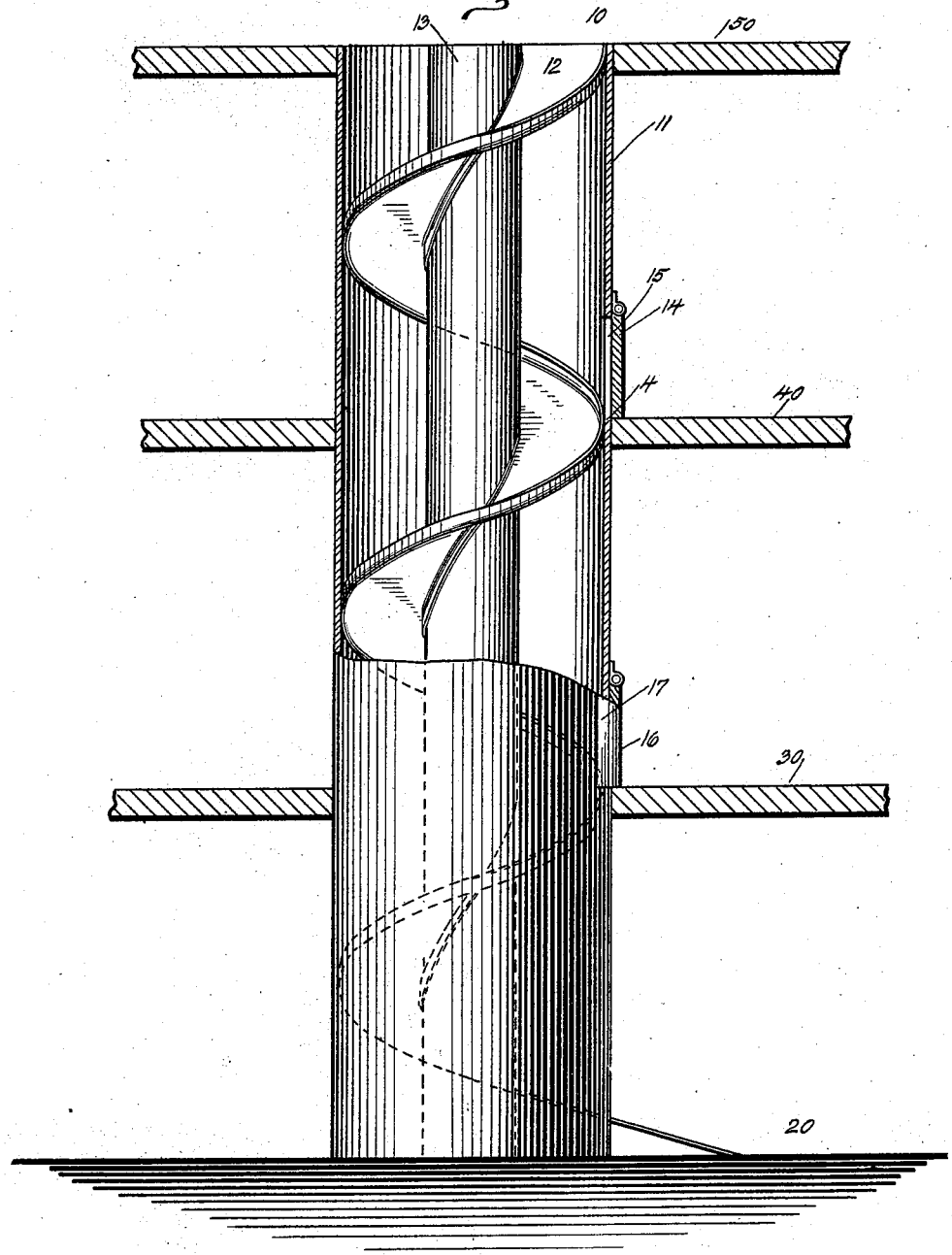
Figure 2:
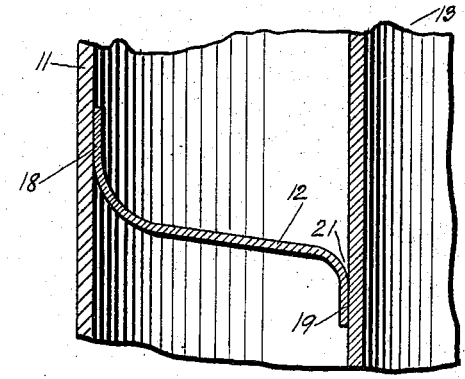
Figure 3:
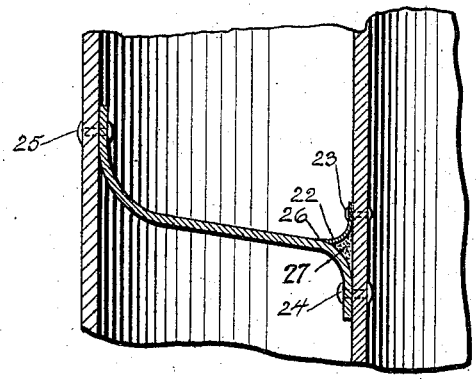
Figure 4:
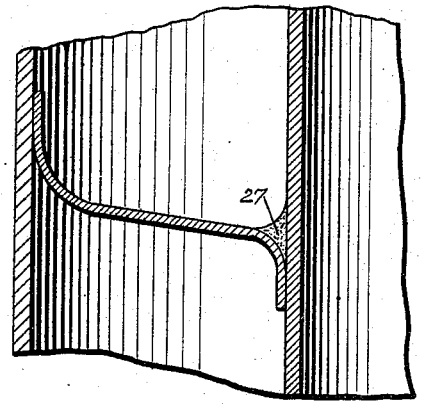

Referring to the drawings, Figure 1 represents in part sectional elevation a spiral gravity conveyer embodying my invention. Figs. 2, 3 and 4 are enlarged sectional views showing various details of construction and modifications thereof.

10 designates a conveyer having an outer casing 11 and a central core 13, between which is secured a spiral blade or conveying surface 12. The conveyer 10 is herein represented as passing through three floors. At each floor or landing one or more openings, such as 15 and 17, are provided in the outside casing 11, which may be closed by doors such as 14 and 16, respectively. These openings may be arranged to receive or discharge articles to or from the spiral surface 12 in a well known way. While the conveyer illustrated is adapted to a building having three floors and a basement, the conveyer may be arranged to connect any desired number of floors or intermediate points. Such conveyers have been in general use for some time, and they are particularly adapted to department stores where large quantities of goods are constantly being sent from one floor to the basement or to some intermediate floor. The spiral blade or conveying surface is usually formed of a single sheet of material which is bent to the desired spiral form and secured to the conveyer casing and inner central core by means of angle irons which are bent to conform in shape to the spiral blade and which are secured to the under side of the blade and adjacent surfaces of the conveyer casing and inner core by countersunk rivets. This method requires considerable fitting and material and involves a great amount of labor and unnecessary expense. A spiral blade or conveying surface arranged after the manner herein set forth is easily constructed and requires no angle irons whatever to securely hold it in proper position in the conveyer casing.

Referring to Fig. 2, it is seen that the spiral blade 12 is formed out of a single piece of sheet metal, one side of which is bent upwardly while the opposite side is bent downwardly, the intervening portion being left flat or substantially so. The spiral blade 12 is brazed to the inner surface of the conveyer casing at the surface of contact 18; the other side of the blade 12 is brazed to the outer surface of the inner core at the surface of contact designated by 19. In this manner the blade 12 is securely held in position without the use of rivets or braces of any kind.

Where articles descend by way of the spiral 12 there is a constant tendency for said articles to fly outwardly from the center, due to centrifugal force. For this reason articles placed upon the conveyer spiral travel close to the inner surface of the casing 11; thus there is no tendency for descending articles to travel in the crevice 21 formed between the spiral blade and the inner core. Where the conveyer is arranged to carry small articles, such as papers, letters, etc., I sometimes use the construction shown in Fig. 3, in which an additional bent strip 22 is arranged to bridge the crevice 21 so that there can be no possibility of small articles or those with sharp corners becoming wedged therein. Where the edge of the bent strip 22 and the surface of the spiral blade 12 come in contact, designated by 26, the former is preferably chamfered so that there will be no sharp edges and the entire conveying surface will be perfectly smooth. The spiral blade may be secured in place by rivets 25 and 24, while the bent strip 22 may also be fastened in proper place by means of rivets 23. If desired, these rivets may be countersunk, or countersunk head screws may be used. At the point 26 where the strip 22 meets the spiral blade 12 a brazed joint is preferable, although other well known means may be employed for securing these parts in proper position.

In Fig. 4 the spiral blade 12 is secured to the conveyer casing and inner core by brazing, as in Fig. 2, the crevice 21 formed between the spiral blade and the surface of the inner core being in this instance completely filled by cement 27 or other suitable material. By rounding off and smoothing the upper surface of the cement filling 27, the entire conveying surface presents one continual unbroken surface without cracks, crevices or projections, such as rivet or screw heads, to retard or interfere with the free passage of articles traveling thereon. Obviously the cement filling 29 may also be used in connection with the bent strip 22, as shown in Fig. 3.

I do not desire to be limited to the precise construction and arrangement of parts herein shown and described, as it is obvious that those skilled in the art may readily make various changes without in any way departing from the spirit and scope of my invention.

What I claim as new and desire to protect by Letters Patent of the United States is:—

1. In a gravity conveyer, the combination with a tubular casing, of a cylindrical core therein, and a flat helical blade between the core and casing having its outer and inner longitudinal edges curved upwardly and downwardly respectively to form continuous flanges on the blade.

2. In a gravity conveyer, the combination with a tubular shell or casing, of an inner tubular core, a flat sheet metal spiral blade having its inner and outer longitudinal edges, turned downward and upward respectively, and forming flanges lying flat against the core and casing, and means for securing said flanges to the core and casing.

3. In a gravity conveyer, the combination with a shell or casing, of a core within the shell, a spiral blade having its inner edge curved downwardly to form a flange in contact with the core, and means for preventing articles entering the crevice formed between the core and blade.

4. In a gravity conveyer, the combination with a shell or casing, of a core within the shell, a spiral blade having a downturned inner edge in contact with the core, and a filling material in the crevice formed between the core and blade.

5. In a gravity conveyer, the combination with a casing, of a core, a flat helical blade having its inner edge curved downwardly, and a curved strip bridging the space between the core and the flat portion of the blade.

In testimony whereof, I have signed my name to this specification in the presence of two subscribing witnesses.

MARTIN C. SCHWAB.

Witnesses:
CARL P. SCHROEDER,
THEODORE VLODIMEROFF.

---

Copies of this patent may be obtained for five cents each, by addressing the "Commissioner of Patents, Washington, D. C."